US012729722B2

(12) United States Patent
Eisfeld et al.

(10) Patent No.: US 12,729,722 B2
(45) Date of Patent: Sep. 8, 2026

(54) BEARING UNIT

(71) Applicant: Baumueller Nuernberg GmbH, Nuremberg (DE)

(72) Inventors: Paul Eisfeld, Nuremberg (DE); Manuela Rudel, Herzogenaurach (DE); Michael Veeh, Kleinrinderfeld (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 213 days.

(21) Appl. No.: 18/381,819

(22) Filed: Oct. 19, 2023

(65) Prior Publication Data

US 2024/0133428 A1 Apr. 25, 2024
US 2024/0229865 A9 Jul. 11, 2024

(30) Foreign Application Priority Data

Oct. 20, 2022 (DE) .................... 10 2022 211 158.3

(51) Int. Cl.
*F16C 35/067* (2006.01)
*F16C 35/063* (2006.01)

(52) U.S. Cl.
CPC .......... *F16C 35/067* (2013.01); *F16C 35/063* (2013.01); *F16C 2226/62* (2013.01); *F16C 2226/76* (2013.01); *F16C 2380/26* (2013.01)

(58) Field of Classification Search
CPC ...... F16C 25/08; F16C 25/083; F16C 35/063; F16C 35/067; F16C 35/077; F16C 2226/62; F16C 2226/76; F16C 2380/26
See application file for complete search history.

(56) References Cited

U.S. PATENT DOCUMENTS 2,735,734 A * 2/1956 Kalikow .............. H02K 5/1732 384/538
2,926,051 A * 2/1960 Cazier ..................... F16C 27/04 384/535
3,881,841 A * 5/1975 Straniti ................. F04D 29/059 415/131
4,412,705 A * 11/1983 Schreiner ............. F16C 35/077 384/584
8,303,188 B2 * 11/2012 Otsuka .................. F16C 25/083 384/537
9,472,994 B2 10/2016 Tanaka et al.
2009/0148092 A1 * 6/2009 Otsuka .................. F16C 35/067 384/569
2016/0290161 A1 * 10/2016 Servant ................. F16C 35/067
2022/0389958 A1 * 12/2022 Barthelme .............. F16C 25/08
2022/0389969 A1 * 12/2022 Barthelme .............. F16C 35/06

FOREIGN PATENT DOCUMENTS

DE 102015210058 A1 12/2016
DE 102020106339 A1 9/2021
EP 301880 A1 5/2016
JP 2013070510 A 4/2013
WO WO2021136834 A1 7/2021

* cited by examiner

*Primary Examiner* — Alan B Waits
(74) *Attorney, Agent, or Firm* — Muncy, Geissler, Olds & Lowe, P.C.

(57) ABSTRACT

A bearing unit having a roller bearing that includes an outer ring and an inner ring that is rotatable with respect to the same about an axis, The inner ring is fastened to a first component, and the outer ring is fastened to an adapter ring that is nonrotatably and axially movably supported on a second component. A method for manufacturing a structural unit and an electric motor are also provided.

7 Claims, 5 Drawing Sheets

26
58
2
32
58
58
30
28

34
32
34
34
16
22
24

BEARING UNIT

This nonprovisional application claims priority under 35 U.S.C. § 119(a) to German Patent Application No. 10 2022 211 158.3, which was filed in Germany on Oct. 20, 2022, and which is herein incorporated by reference.

BACKGROUND OF THE INVENTION

Field of the Invention

The invention relates to a bearing unit having a roller bearing. The invention further relates to a method for manufacturing a structural unit having a bearing unit, and to an electric motor.

Description of the Background Art

Electric motors typically have an essentially hollow-cylindrical housing which is closed at each of its end-face sides by an end shield, one of which is the so-called A-side end shield, situated on the side of the electric motor at which a drive of a component connected thereto takes place. The opposite end shield is referred to as the B-side end shield. The end shields themselves are fastened to the housing. A roller bearing is generally situated at each end shield, and rotatably supports a shaft of the electric motor that is guided through the housing.

The roller bearing is rigidly fastened to the end shield on the side of the B-side end shield. In other words, this roller bearing is a fixed bearing. Since the thermal properties of the individual components of the electric motor are different, with increasing temperature the shaft may possibly expand to a different extent than the housing, which determines the distance of the end shields from one another. To avoid formation of mechanical stresses in the shaft between the two end shields, the bearing associated with the other end shield, namely, the A-side end shield, is axially movably supported on same, i.e., along the direction of extension of the shaft. In other words, this is a floating bearing.

To implement the floating bearing, the roller bearing is generally fastened to the end shield via a force fit, not a form fit. The force fit is such that, for forces that occur in the axial direction, and which otherwise would result in formation of mechanical stresses, a displacement of the roller bearing at the end shield takes place. To provide the force fit, for example the roller bearing is enclosed on the outer side by an O-ring made of an elastic material, such as a plastic or rubber. The roller bearing is inserted into a cup-shaped or hollow-cylindrical receptacle of the end shield, the mechanical contact between the end shield and the roller bearing taking place solely via, or at least also via, the O-ring.

However, due to such a connection of the roller bearing to the end shield, in addition to the axial movement, a rotational movement of the complete bearing relative to the end shield is also possible, which takes place, for example, when there is a comparatively high load on the electric motor or when imbalance is present. However, during the rotational movement, friction occurs between the O-ring and the roller bearing and/or the end shield, which may result in abrasion of individual particles, i.e., wear. Consequently, a secure connection of the bearing to the end shield is no longer ensured. In addition, the heat that arises due to the friction may result in further damage, such as deformation of the O-ring. The abraded particles may also possibly enter into the roller bearing and at least partially impair its functioning.

SUMMARY OF THE INVENTION

It is therefore an object of the invention to provide a particularly suitable bearing unit and a particularly suitable method for manufacturing a structural unit, as well as a particularly suitable electric motor, in particular with an increase in durability and an advantageous reduction in manufacturing costs.

The bearing unit can include a roller bearing as well as a first and a second component. One or both of the components is/are made up, for example, of multiple individual parts or advantageously formed in one piece. At least one of the two components is preferably made of a metal, such as an aluminum, i.e., pure aluminum or an aluminum alloy, or a steel. Robustness is increased in this way. The first component is supported with respect to the second component by means of the roller bearing so as to be rotatable about an axis. For example, the first component is a hub and the second component is a fixed axis. However, the first component is particularly preferably a shaft that is made, for example, of a steel, such as a hardened steel. The second component is, for example, an integral part of a housing or preferably an end shield or an integral part of the end shield.

For example, the bearing unit may be an integral part of an electric motor or of a gear. The bearing unit is advantageously an integral part of an industrial facility or at least of a tool. In particular, the bearing unit is an integral part of an injection molding machine, such as an electric motor of the injection molding machine. During operation, a power between 18 kW and 150 kW is preferably transmitted by use of the bearing unit.

The roller bearing can have an outer ring, and an inner ring that is rotatable with respect to same about the axis. The inner ring is advantageously surrounded on the outside by the outer ring, and the outer ring and the inner ring are preferably arranged concentrically with respect to the axis. The inner ring and the outer ring preferably have a rotationally symmetrical design with respect to the axis, thus avoiding imbalance. Multiple rolling elements such as cylinders or balls are advantageously situated between the inner ring and the outer ring, via which the inner ring and the outer ring rest against one another. In particular, the inner ring and the outer ring are made of the same material, for example a steel, and therefore have essentially the same thermal expansion. Any rolling elements are preferably made of a comparatively robust material, for example a steel.

The inner ring can be fastened to the first component. In other words, the first component is immovable relative to the inner ring, and the inner ring is rotatably fixedly connected to the first component, so that a rotation of same relative to one another is prevented. In addition, an axial movement of the inner ring relative to the first component is prevented. In particular, the first component, at least in the area of the inner ring, is radially surrounded by the inner ring, in particular with respect to the axis. The inner ring and the first component are suitably in direct mechanical contact with one another. For example, the inner ring is mounted on the first component by means of an adhesive or by use of fasteners such as screws. The inner ring is suitably shrink-fitted onto the first component. The first component is preferably rotationally symmetrical with respect to the axis, thus avoiding imbalance.

An adapter ring can be fastened to the outer ring. Likewise, the adapter ring is not rotatable relative to the outer ring, and it is also not possible to move the outer ring relative to the adapter ring in a longitudinal direction, such as an axial direction, so that they form in particular a structural unit. In other words, a relative movement of the adapter ring with respect to the outer ring is not possible, or at least not desirable. In particular, the adapter ring is situated concentrically with respect to the axis.

The outer ring itself is supported on the second component so as to be nonrotatable and axially movable. In other words, it is possible to move the adapter at least slightly relative to the second component along the axis, in particular a maximum path length being limited by means of a stop. Alternatively, no limitation of the maximum path length is present. It is preferably possible to move the adapter ring, and thus also the outer ring, relative to the second component by at most 1 cm, 5 mm, or 1 mm along the axis. The adapter ring is thus nonrotatably supported on the second component, so that due to the anti-twist protection a rotational movement of the adapter ring, and thus also of the outer ring, relative to the second component about the axis is prevented.

Due to the design of the bearing unit, an axial movement of the roller bearing relative to the second component is possible, so that a floating bearing is formed. Consequently, it is possible to compensate for a different expansion, for example due to heat input, of the first component and of the second component, and/or of the parts to which the second component is fastened, without resulting in an excessive increase in friction in the roller bearing and/or occurrence of mechanical stresses. Durability is thus increased. Due to the twist-proof bearing of the adapter ring on the outer ring, essentially no abrasion or other wear between the adapter ring and the second component occurs, even at comparatively high rotational speeds of the first component with respect to the second component, which reduces wear on the adapter ring and the second component. In addition, essentially no abraded particles, which accumulate between the outer ring and the inner ring, for example, and which may thus impair functioning of the roller bearing, are thus present in the area of the bearing unit. Durability is increased for this reason as well.

Due to the use of the adapter ring, it is possible for the roller bearing to use a standard part. In other words, there are no particular specifications for the roller bearing. On the one hand, manufacturing costs for the roller bearing are thus reduced. On the other hand, availability is increased due to the option to use standard parts. In other words, delivery time for the roller bearing is shortened, so that the bearing unit may be manufactured with essentially no further restrictions. Only the adapter ring must be suitably manufactured, for which there are comparatively low requirements compared to the roller bearing.

The second component in particular has a recess, in particular in the inner ring, within which the roller bearing is at least partially situated. The first component preferably protrudes through the recess, and the first component is circumferentially surrounded, at least in sections, by the second component. In particular, the adapter ring circumferentially surrounds the outer ring. In other words, the adapter ring is offset outwardly from the outer ring relative to the axis.

The adapter ring is, for example, manufactured from multiple different parts that are assembled, for example by adhesive bonding or by use of one or more fastening elements such as screws. For example, the parts are put together in order to fasten the adapter ring to the outer ring. However, the outer ring is particularly preferably one piece, thereby increasing robustness. For example, one or more fasteners such as screws is/are used to fasten the adapter ring to the outer ring. In one alternative, the adapter ring is designed in the manner of a clamp that is tightened around the outer ring, an appropriate fasteners advantageously being used. In a further alternative, the adapter ring is fastened to the outer ring using an adhesive. However, the adapter ring is particularly preferably shrink-fitted onto the outer ring. For this purpose, for example the adapter ring is heated to a comparatively high temperature so that it expands. The adapter ring is subsequently suitably positioned with respect to the outer ring and cooled, thus reducing its expansion and establishing a force-fit connection between same. Prior to installation, the inner diameter of the adapter ring is suitably slightly smaller than the outer diameter of the outer ring. As a result of this type of fastening, no additional fasteners are necessary, which reduces manufacturing costs. In addition, development of imbalance is avoided. Furthermore, there is consequently no damage to the outer ring and thus no structural weakening of the roller bearing, which increases durability.

For example, the adapter ring surrounds the outer ring only circumferentially. However, the outer ring is particularly preferably enclosed by the adapter ring. The adapter ring thus overhangs, at least partially, preferably only on one side, the outer ring in the axial direction, i.e., in a direction parallel to the axis. In addition, the overhang is designed in such a way that it rests against the end-face side of the outer ring. In summary, the cross section of the adapter ring along the axis is L-shaped, at least in part. A stop is thus formed which specifies the position of the adapter ring with respect to the outer ring. Installation is simplified in this way. Furthermore, stabilization of the adapter ring is provided via the radially inwardly offset portion of the adapter ring, thus increasing robustness. In particular, the overhang and thus the enclosure are only on one side, thus enabling insertion of the outer ring into the adapter ring from the end opposite the stop.

For example, the second component has multiple protrusions or the like that engage with corresponding recesses in the adapter ring which are each situated in parallel to the axis. In particular, the anti-twist protection and/or the axial bearing are/is at least partially achieved by means of these protrusions. However, the adapter ring particularly preferably has multiple extensions running parallel to the axis. The extensions are spaced apart from the axis, and in particular are radially outwardly offset from the outer ring with respect to the axes. Each of the extensions is guided in a corresponding receptacle of the second component. In particular, a clearance fit is formed between each extension and the particular receptacle, thus allowing displacement of the extensions in the receptacles. In particular, it is possible to move each extension between 0.5 mm and 5 mm in the respectively associated receptacle. Movability of the extensions in the particular receptacle is preferably limited to less than 2 mm or to 1 mm, for example. In other words, the depth of each of the receptacles is in particular 1 mm greater than the length of the particular extension.

The axially movable bearing of the adapter ring at the second component takes place by means of the extensions and the receptacles, the anti-twist protection being achieved due to the clearance fit between the receptacles and the extensions. A comparatively inexpensive connection of the adapter ring to the second component is thus achieved. It is possible to use an existing second component, into which appropriate receptacles are introduced. An existing design for the second component is thus usable, and it is not necessary make injection molds or molding forms for the second component. Manufacturing costs for the second component are thus reduced. In summary, the second component is upgraded for twist-proof and axially movable bearing of the adapter ring by material removal. For example, the receptacles have a circumferentially closed design, or are preferably slotted, at least on one side, parallel to the axis. It is thus possible for air to escape from the receptacles, and formation of an air pocket in the receptacles, which could otherwise result in limitation of axial movability, is avoided.

At least two such extensions as well as two receptacles are preferably present, thus providing comparatively robust anti-twist protection. Alternatively, only one such extension and a single corresponding receptacle are present. The number of extensions and the number of corresponding receptacles is preferably less than 10 or 5. This lowers manufacturing costs and simplifies the design. In addition, the space requirements are reduced. Three such extensions and corresponding receptacles are advantageously present, so that tilting of the adapter ring relative to the second component is avoided, while the number of receptacles and extensions is still comparatively small. In particular, the extensions and receptacles are situated rotationally symmetrically with respect to the axis, so that an angle of 120° relative to the axis is formed in each case between the extensions and receptacles, thus increasing stability.

The adapter ring suitably has a circumferential ridge radially pointing away from the outer ring. The ridge does not extend along the entire extension of the adapter ring in the axial direction, and instead is shortened in comparison. In particular, the ridge is associated with one of the ends of the adapter ring in the axial direction, and in particular forms same. The extensions are fastened to the ridge. If the outer ring is enclosed by the adapter ring, the ridge is preferably situated opposite the radially inwardly directed overhang, so that the cross section of the adapter ring in the axial direction has an essentially T shape, at least in part. As a result of the ridge, the fastening of the adapter ring to the outer ring is not impaired by the extensions, thus increasing stability.

For example, the extensions are initially separate components that are fastened to the ridge. It is thus possible to use different materials, which in particular are adapted to the particular use, for the extensions and the further parts of the adapter ring. In particular, the ridge has corresponding holes or boreholes for this purpose, into which the extensions, which are designed in the manner of pins, for example, are inserted. For example, the extensions are screwed or pressed into the holes. Alternatively, the extensions are adhesively bonded to the ridge.

The extensions can be designed in the manner of a lug, and in particular further parts of the adapter ring are integrally formed on the ridge. In other words, in particular the extensions together with the further parts of the adapter ring, or at least the ridge, are originally formed. Robustness is increased, and in particular manufacturing time is shortened, due to the one-piece design. The extensions, which are also advantageously fastened to further parts of the outer ring, are stabilized by means of the ridge, thus increasing robustness.

The adapter ring particularly can have a threaded borehole that advantageously extends in parallel to the rotational axis. The threaded borehole has a female thread. In particular, the threaded borehole is introduced into any ridge that is present, so that with respect to the outer ring, the ridge is offset away from the axis. The threaded borehole is in particular congruent with a hole in the second component, which in particular likewise extends in parallel to the axis. The diameter of the hole corresponds at least to the diameter of the threaded borehole, or is larger. It is thus possible to screw a threaded rod through the second component and into the threaded borehole in the adapter ring. In particular, the hole is smooth on the inside, so that movability of the threaded rod is not hindered by the hole.

The position of the adapter ring relative to the hole and thus relative to the second component is specified by the threaded rod, and it is thus possible to install the adapter ring at the second component only in one predetermined position. In this position, in particular the adapter ring engages with corresponding contours of the second component, and in particular the extensions engage with the corresponding receptacles, so that an axially movable bearing of the adapter ring on the second component takes place. In summary, during installation, for example, the adapter ring is aligned with respect to the second component by means of the threaded rod. Alternatively or in combination, the axially displaceable and nonrotatable bearing of the adapter ring with respect to the second component takes place in part by means of the threaded rod.

The method is used to manufacture a structural unit that includes a bearing unit. The bearing unit includes a roller bearing having an outer ring, and an inner ring that is rotatable relative thereto about an axis. In the installed state, the inner ring is fastened to a first component, and the outer ring is fastened to an adapter ring. The adapter ring is nonrotatably and axially movably supported on a second component. The adapter ring has a threaded borehole, which in the installed state is congruent with a hole in the second component. The structural unit is, for example, an electric motor, a portion of an electric motor, or for example a gear or a portion of a gear.

According to the method, the first component, to which the roller bearing is fastened, is provided. In particular, the first component is a shaft made of a steel, for example. In particular, the inner ring of the roller bearing is shrink-fitted onto the first component, for example the shaft. The adapter ring is already fastened to the outer ring. The adapter ring is not yet supported on the second component, which in particular is separate from the adapter ring.

A threaded rod is screwed into the threaded borehole in a further work step. For example, this work step takes place before the adapter ring is fastened to the outer ring, and/or before the roller bearing is fastened to the first component. However, the threaded rod is particularly preferably not screwed into the threaded borehole until after the roller bearing is fastened to the first component, and the adapter ring is fastened to the outer ring, so that the fastening of the individual parts to one another is not hindered by the presence of the threaded rod. For example, the threaded rod is screwed completely into the threaded borehole, or advantageously only to the extent after which the threaded rod does not come out of the threaded borehole on its own. The expenditure of labor is thus reduced.

The threaded rod is subsequently guided through the hole in the second component. In particular, the first component is also moved through a recess in the second component, within which the inner ring is also advantageously situated, at least in part, in the installed state. As a result of guiding the threaded rod through the hole, in particular in conjunction with the positioning of the first component relative to the second component, the adapter ring is oriented with respect to the second component and arranged in such a way that it is nonrotatably and axially movably supported on the second component. Due to the rotatability of the outer ring relative to the inner ring, essentially no effort is required for the alignment. In other words, due to the threaded rod, the adapter ring is oriented in such a way that, for example, any extensions engage with the corresponding receptacles, or at least the corresponding bearing of the adapter ring on the second component takes place. For example, the adapter ring is latched to the second component for this purpose.

In a further work step, the second component is fastened to a further part, in particular a housing or a part of a housing. For example, the second component is screwed or welded to the further part. For example, axial displaceability of the adapter ring with respect to the second component is limited by fastening the second component to the further part. In particular, the threaded rod is subsequently removed from the threaded borehole and the hole. The threaded rod may thus be used to manufacture a further structural unit. The hole is advantageously closed after the threaded rod is removed. In particular, the invention further relates to such a structural unit, which, for example, is a gear, an integral part of a gear, an electric motor, or an integral part of an electric motor.

The electric motor is, for example, an integral part of an industrial facility, preferably an actuator, that is suitable, in particular provided and configured, for manufacturing or machining a workpiece. For example, the electric motor is an integral part of an injection molding machine, and in particular has a power greater than 10 kW or 20 kW. The power of the electric motor is suitably less than 200 kW.

The electric motor has a bearing unit with a roller bearing that includes an outer ring, and an inner ring that is rotatable with respect to the outer ring about an axis. The inner ring is fastened to a first component, and the outer ring is fastened to an adapter ring. The adapter ring is nonrotatably and axially movably supported on a second component. The first component is formed by means of a shaft, and the second component is formed by means of an end shield of the electric motor.

The end shield can be an A-side end shield, and in particular a floating bearing is formed by means of the bearing unit. The shaft is preferably supported via a further bearing, this bearing advantageously being designed as a fixed bearing that is fastened to the B-side end shield. The electric motor preferably includes a housing that has an in particular hollow-cylindrical design and that extends between the two end shields. The housing suitably forms a further part to which the B-side end shield, preferably also the A-side end shield, is/are fastened. The electric motor thus forms a structural unit, the A-side end shield advantageously having a hole that is congruent with a threaded borehole in the adapter ring. Manufacture of the electric motor according to the method is made possible in this way. Thus, it is possible in particular to provide the housing with the B-side end shield already fastened thereto, the shaft together with a possible rotor already having been inserted into the housing. The A-side end shield is used to close the housing, the installation taking place by use of the threaded rod. An appropriate alignment of the bearing unit thus takes place from outside the housing, and the housing may thus have a comparatively stable design. In particular, after the threaded rod is removed the hole is closed, for example by means of a stopper. Penetration of foreign particles into the housing of the electric motor is thus avoided.

The refinements and advantages explained in conjunction with the bearing unit are also to be analogously transferred to the method/the structural unit/the electric motor as well as among one another, and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
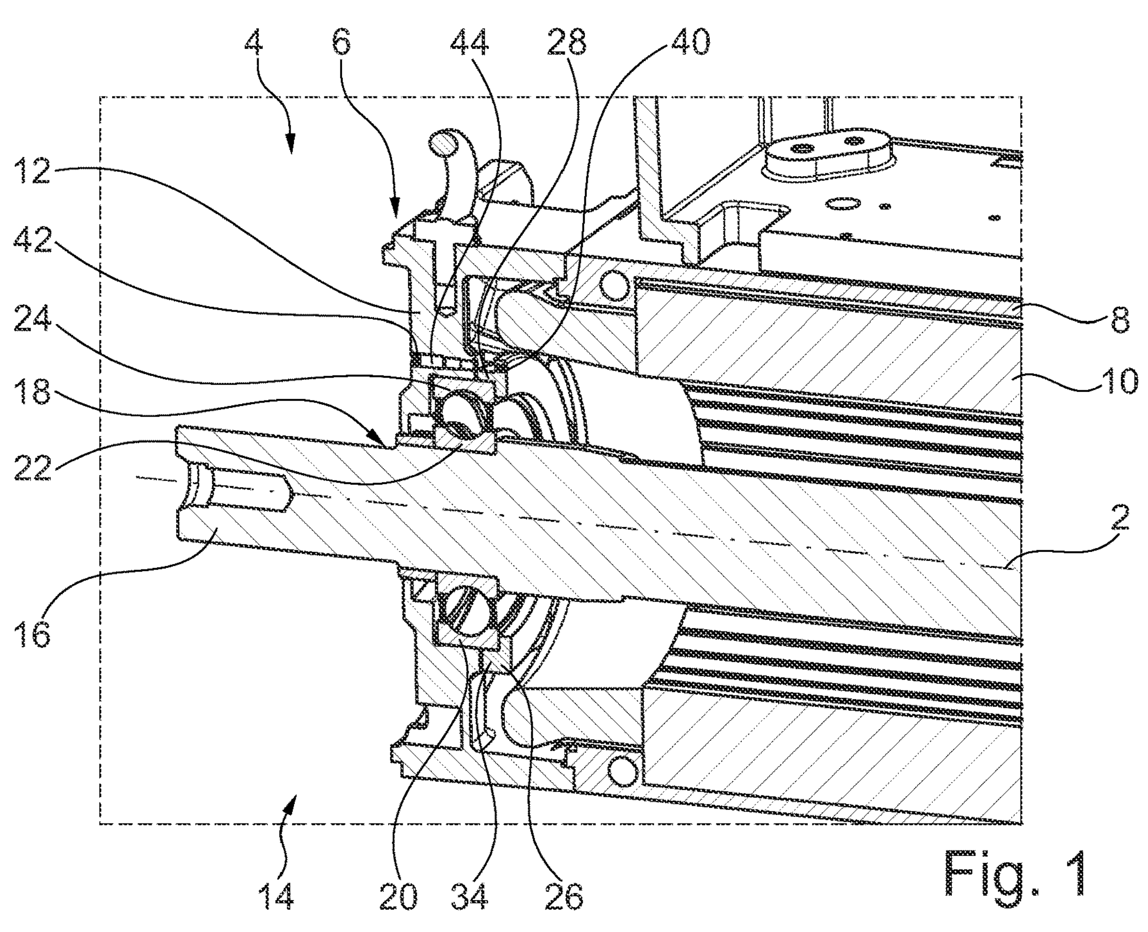
FIG. 1 shows a perspective sectional illustration of a detail of an electric motor that forms a structural unit, and that includes a bearing unit.

FIG. 1 shows a perspective sectional illustration of a detail of an electric motor 4 along an axis 2. The electric motor 4 has a power of 100 kW, and in the installed state is an integral part of an injection molding machine. The electric motor 4 includes a structural unit 6 with a further part 8, namely, a housing having a hollow-cylindrical design which is situated along the axis 2, the axis 2 passing essentially centrally through the housing. A stator 10 that is protected by means of the further part 8 is situated inside the housing, i.e., the further part 8.

A second component 12 of the structural unit, namely, an A-side end shield 6, is fastened to the further part 8. The second component 12, the same as the further part 8, is made of an aluminum. The second component 12 is an integral part of a bearing unit 14, which also includes a first component 16, namely, a shaft, which is arranged concentrically with respect to the axis 2 and extends along same. The first component 16 is made of an unhardened steel, and is guided through a recess 18 in the second component 12.

In addition, situated in part within the recess 18 is a roller bearing 20 that has an inner ring 22 which is rotatable relative to an outer ring 24 of the roller bearing 20. The inner ring 22 and the outer ring 24 are arranged concentrically with respect to the axis 2, and the outer ring 24 circumferentially surrounds the inner ring 22. Rolling elements, namely, in the present example multiple balls by means of which the mechanical contact between the inner ring 22 and the outer ring 24 takes place, are situated between the inner ring and the outer ring. The rolling elements are held between the inner ring 22 and the outer ring 24 due to a partial form fit, so that an axial movement of the two relative to one another, i.e., parallel to the axis 2, is not possible. A standard part may be used for the roller bearing 20.

The inner ring 22 is fastened to the first component 16, namely, the shaft, for example by shrink fitting. A movement of the inner ring 22 relative to the first component 16, in particular along the axis, and also a rotation of the inner ring 22 about the axis 2 are thus prevented.

Figure 2:
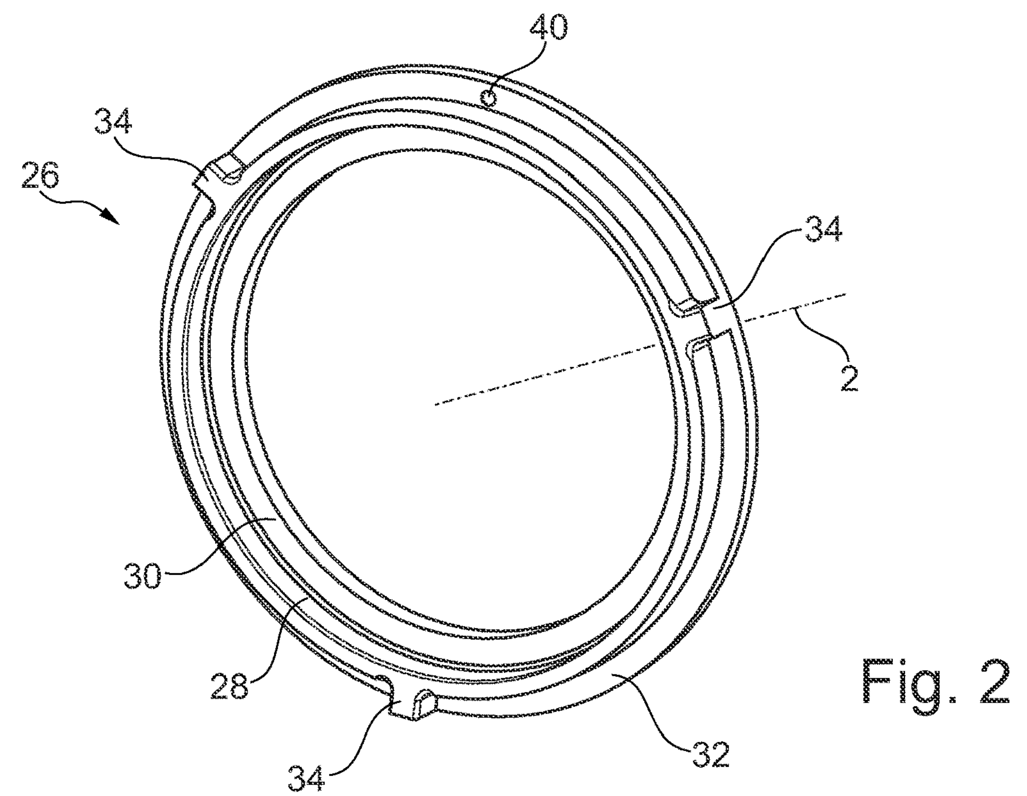
FIG. 2 shows a perspective view of an adapter ring of the bearing unit.

The outer ring 24 is circumferentially surrounded by an adapter ring 26, which in FIG. 2 is shown in a perspective illustration from the side of the roller bearing 20. The adapter ring 26 is made of a steel or aluminum, and has a body 28 with a hollow-cylindrical design which in the installed state circumferentially surrounds the outer ring 24 and rests against same. The extension of the adapter ring 26 in the axial direction, i.e., in parallel to the axis 2, is smaller than the extension of the outer ring 24. An overhang 30, i.e., a protrusion, which is curved or offset toward the axis 2, is integrally formed on the body 28. The overhang 30 is situated in a disk-like manner and concentrically with respect to the axis 2, so that the overhang 30 forms a stop for the outer ring 24, against which the outer ring rests on the end-face side. As a result, the outer ring 24 is enclosed by the adapter ring 26.

Figure 3:
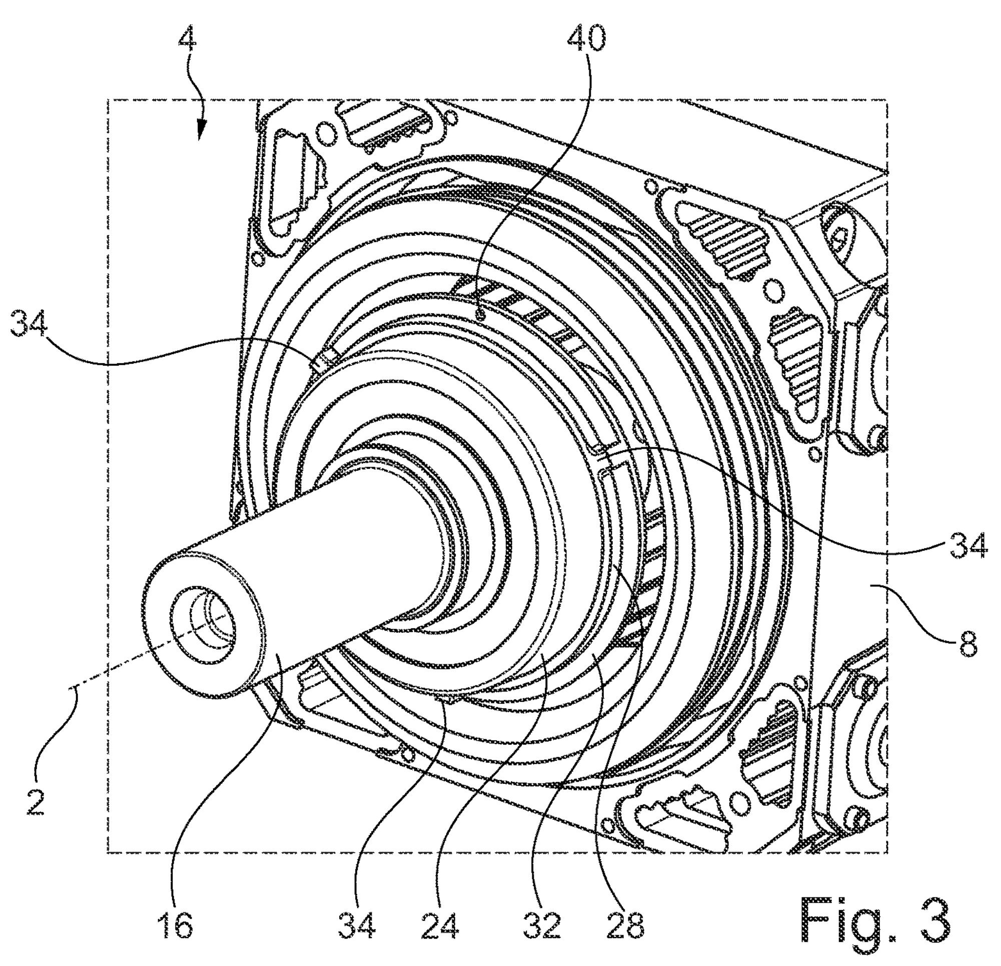
FIG. 3 shows a perspective view of the adapter ring mounted on a roller bearing of the bearing unit.

The adapter ring 26 is fastened to the outer ring 24, so that a movement of the two relative to one another is not possible, as also illustrated in a perspective view in FIG. 3, in which the second component 12, namely, the end shield of the electric motor 4, is not shown. The adapter ring 26 is shrink-fitted onto the outer ring 24 for the fastening. For this purpose, the outer ring 26 is initially heated so that its diameter, namely, in particular the diameter of the body 28, expands. The roller bearing 20 and thus the outer ring 24 are subsequently inserted into the body 28 in the axial direction, from the side facing away from the overhang 30, until the outer ring 24 rests against the overhang 30. The adapter ring 26 is subsequently recooled, so that it contracts and rests against the outer ring 24 in a force-fit manner. Thus, no structural weakening of the roller bearing 20 occurs during the fastening.

A ridge 32 of the adapter ring 26, which likewise has a disk-shaped design, is situated opposite the overhang 30, namely, is radially outwardly offset. In other words, the ridge 32 points radially away from the axis 2 and thus also away from the outer ring 24, and the ridge 32 has a circumferential design. The cross section of the adapter ring 26 along the axis 2 thus has a T shape in part. In addition, the adapter ring 26 has a total of three extensions 34 that have a lug-like design and extend in parallel to the axis 2. Each of the essentially cube-shaped extensions 34 is in flush alignment with the end of the ridge 32 in the radial direction with respect to the axis 2, and is in flush alignment with one of the ends of the body 28 in the axial direction. The extensions 34 are integrally formed on the body 28 and the ridge 32, and the entire outer ring 26 is formed as one piece.

Figure 4:
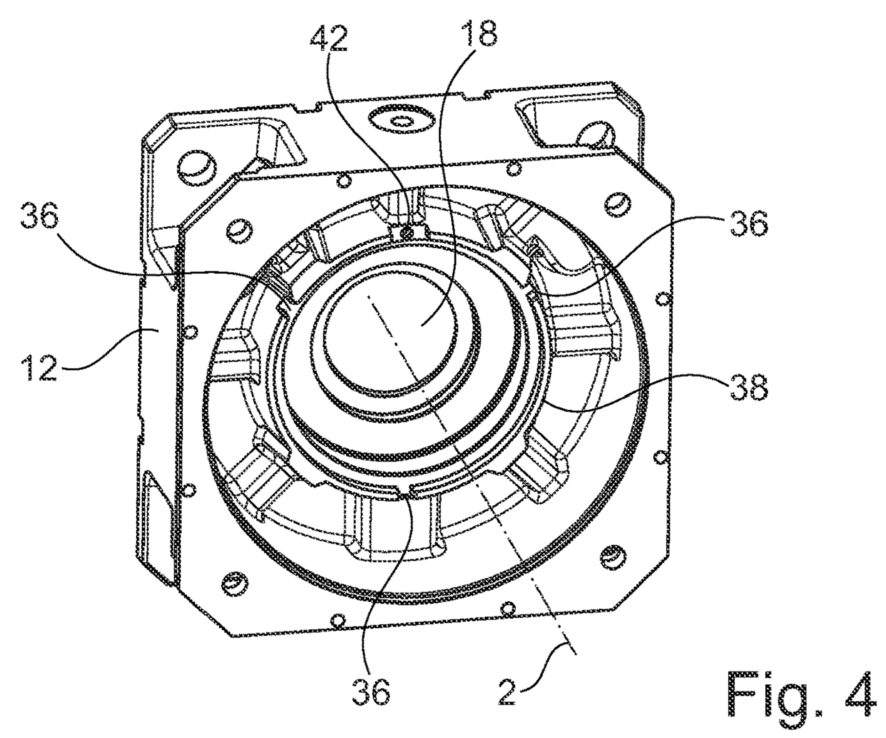
FIG. 4 shows a perspective view of an end shield of the electric motor, which forms a second component of the bearing unit.

The second component 12, namely, the end shield, has three receptacles 36 that extend in parallel to the axis 2, as illustrated in a perspective view in FIG. 4 from the side of the further part 8. The receptacles 36 are provided in a hollow-cylindrical collar 38 of the second component 12 which surrounds the recess 18. The receptacles 36 are formed essentially by slots in the collar 38 that extend in parallel to the axis 2. In the installed state, in each case one of the extensions 34 rests in one of the collars 36, a clearance fit being formed between same. The extension of each receptacle 36 in the axial direction is 1 mm larger than the extension of the respective associated extension 34, so that a movement of the adapter ring 26 relative to the collar 38, and thus also relative to the second component 12, is possible to a limited extent. In other words, one of the receptacles 36 in each case is associated with one of the extensions 34, and is guided by the extensions.

In summary, the adapter ring 26 is axially movably supported on the second component 12, the extent of the movability being limited to 1 mm due to the design of the receptacles 36, the extensions 34, and the ridge 32, as well as the collar 38. A rotational movement of the adapter ring 26 relative to the second component 12 is not possible on account of the clearance fit between the extensions 34 and the receptacles 36.

In summary, the adapter ring 26 is nonrotatably and axially movably supported on the second component 12. Therefore, the outer ring 24 of the roller bearing 20 is also correspondingly supported on the second component 12. In other words, the roller bearing 20 forms a floating bearing of the electric motor 4. The first component 16 is rotatably supported on the second component 12 by means of the roller bearing 20. The end shield, i.e., the second component 12, is an A-side end shield, for which reason in the installed state, a component to be driven is situated on this side of the electric motor 4.

The extensions 34, and thus also the receptacles 36, are each offset relative to one another by 120° with respect to the axis 2. A threaded borehole 40 having a female thread is introduced into the ridge 32, centrally between two of the extensions 34. In the installed state, the threaded borehole is congruent with a hole 42 in the second component 12 that extends in parallel to the axis 2. The diameter of the hole 42 is larger than the diameter of the threaded borehole 40, so that the projection of the hole 42 onto the ridge 32 completely overlays the threaded borehole 40. As a result, the hole 42 is situated between two of the receptacles 36, and with same encloses an angle of 60° with respect to the axis 2. A stopper 44 made of a rubber is introduced into the hole 42 from the outer side, i.e., from the end opposite the adapter ring 26. The stopper prevents penetration of foreign particles via the hole 42 into the interior of the electric motor 4.

Figure 5:
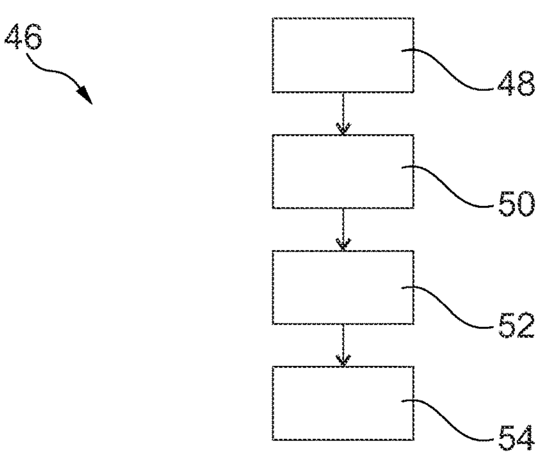
FIG. 5 shows a method for manufacturing the structural unit.

FIG. 5 illustrates a method 46 for manufacturing the structural unit 6. The first component 16 is provided in a first work step 48, as illustrated in FIG. 3. The roller bearing 20 is already fastened, for example by shrink fitting, to the first component 16, and the adapter ring 26 is already fastened, for example likewise by shrink fitting, to the outer ring 24, i.e., to the roller bearing 20. The first component 16 and a rotor fastened thereto are situated inside the further part 8 and the stator 10 fastened thereto, and the opposite end of the housing, formed by the further part 8, is closed by means of an A-side end shield. The first component 16, i.e., the shaft, is supported so as to be rotatable about the axis 2 by means of a bearing fastened to the A-side end shield, this bearing being a fixed bearing.

In a subsequent second work step 50, a threaded rod that is situated parallel to the axis 2 is screwed into the threaded borehole 40 from the side facing away from the further part 8. The threaded rod extends, for example, to the end of the shaft, i.e., the first component 16, in the axial direction.

In a subsequent third work step 52, the second component 12 is mounted on the first component 16 and on the threaded rod. For this purpose, the first component 16, as the shaft, is guided through the recess 18, and the threaded rod, which is detachably fastened to the adapter ring 26, is guided through the hole 42 in the second component 12, i.e., the end shield.

As a result, the adapter ring 26 is oriented in a certain position relative to the second component 12. In other words, the threaded rod ensures that the threaded borehole 40 is congruent with the hole 42. Due to the orientation by means of the threaded rod, the extensions 34 slide into the receptacles 36 as the second component 12 approaches the further part 8, so that when the second component 12 is mounted on the further part 8, the adapter ring 26 is nonrotatably and axially movably supported on the second component 12.

In a subsequent fourth work step 54, the second component 12 is fastened to the further part 8, so that the second component 12 cannot be detached from the further part 8. For this purpose the end shield is screwed or welded, for example, to the housing. The threaded rod is subsequently unscrewed from the threaded borehole 40 and removed from the hole 42, the threaded rod being detached from the electric motor 4, i.e., also from the structural unit 6. The stopper 44 is subsequently introduced into the hole 42, so that the electric motor 4 is closed.

In summary, for the bearing unit 14 a bearing of the first component 16, namely, the shaft, on the second component 12, i.e., the end shield, takes place, wherein axial movability of the roller bearing 20 is present so that a floating bearing is formed. A standard part may be used for the roller bearing 20. For an existing second component 12, only slight adaptations are necessary, while the remaining parts of the structural unit 6 and of the electric motor 4 do not have to be changed.

Figure 6:
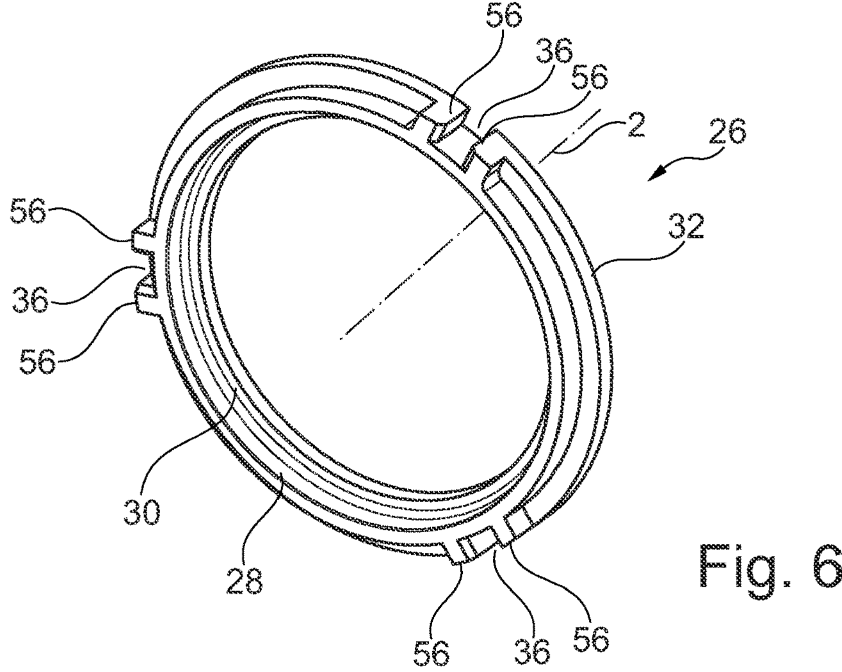
FIG. 6 shows a perspective view of an alternative embodiment of the adapter ring.
Figure 7:
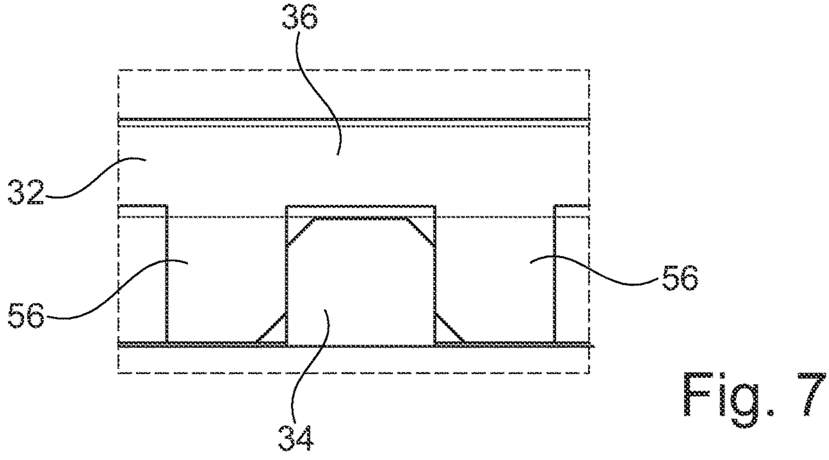
FIG. 7 shows a detail of the adapter ring according to FIG. 6, which is supported on an adapted second component.

FIG. 6 shows a perspective illustration of an alternative embodiment of the adapter ring 26, having an unchanged body 28 as well as the unchanged overhang 30. In contrast, the circumferential ridge 32 has three interruptions which are delimited in each case by edges 56 extending on both sides in the axial direction, and which protrude outwardly from the body 28 in the radial direction. Each interruption and the associated edges 56 in each case form one of the receptacles 36. In each case one of the correspondingly designed extensions 34 rests within each of the receptacles; however, in this embodiment the extension is an integral part of the second component 12, as illustrated in a side view in FIG. 7. Here as well, the receptacles 36 and the extensions 34 are offset in each case by 120° relative to one another with respect to the axis 2.

Figures 8, 9:
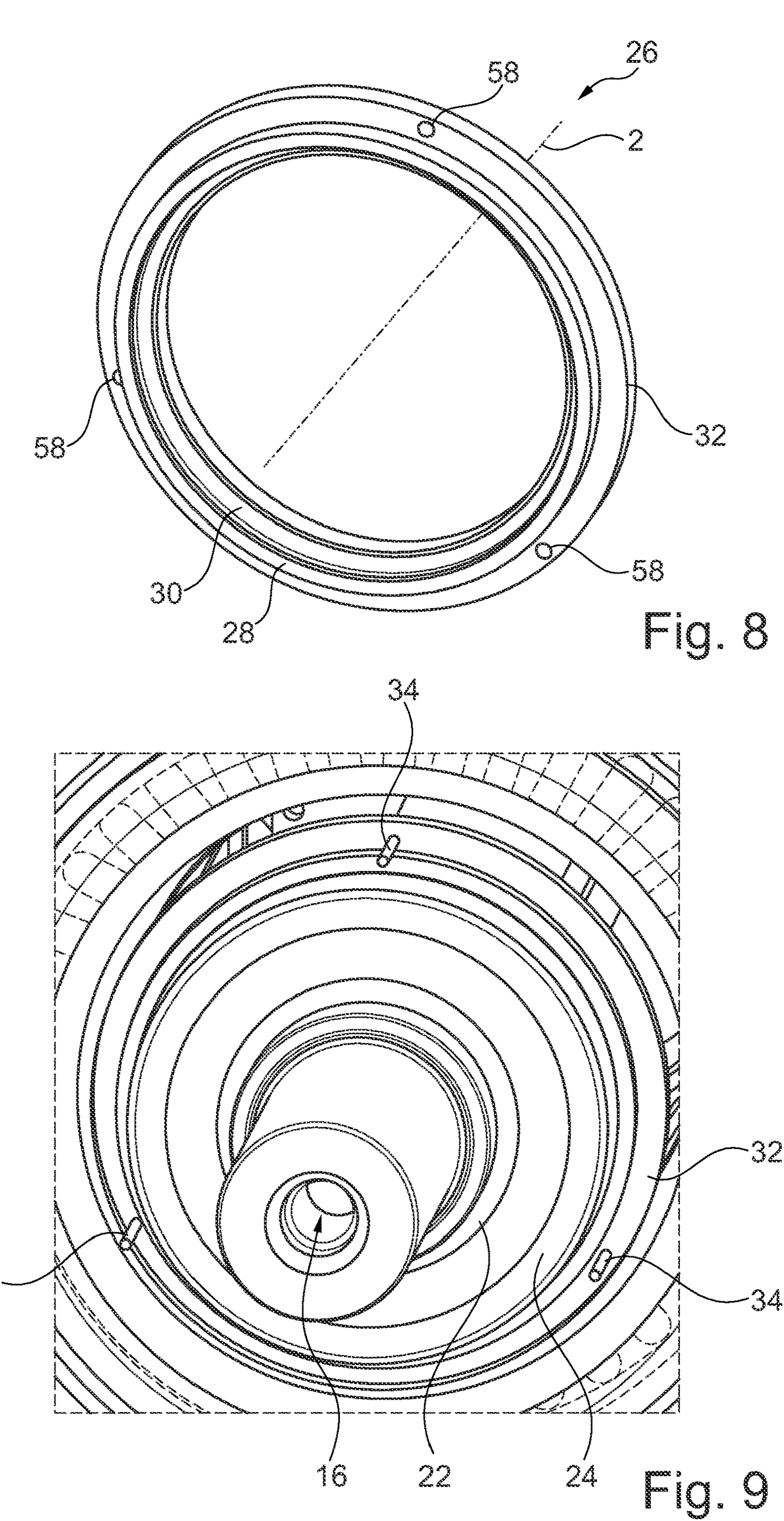
FIG. 8 shows a perspective view of a further embodiment of the adapter ring.
FIG. 9 shows a perspective view of the adapter ring according to FIG. 8, which is mounted on the roller bearing of the bearing unit.

FIG. 8 shows a perspective illustration of a further embodiment of the adapter ring 26, here as well the body 28 and the overhang 30 being unchanged. Once again the circumferential ridge 32 is present, in which three holes 58 extending in parallel to the axis 2 are introduced. The holes 58 are offset by 120° relative to one another with respect to the axis 2.

Figure 10:
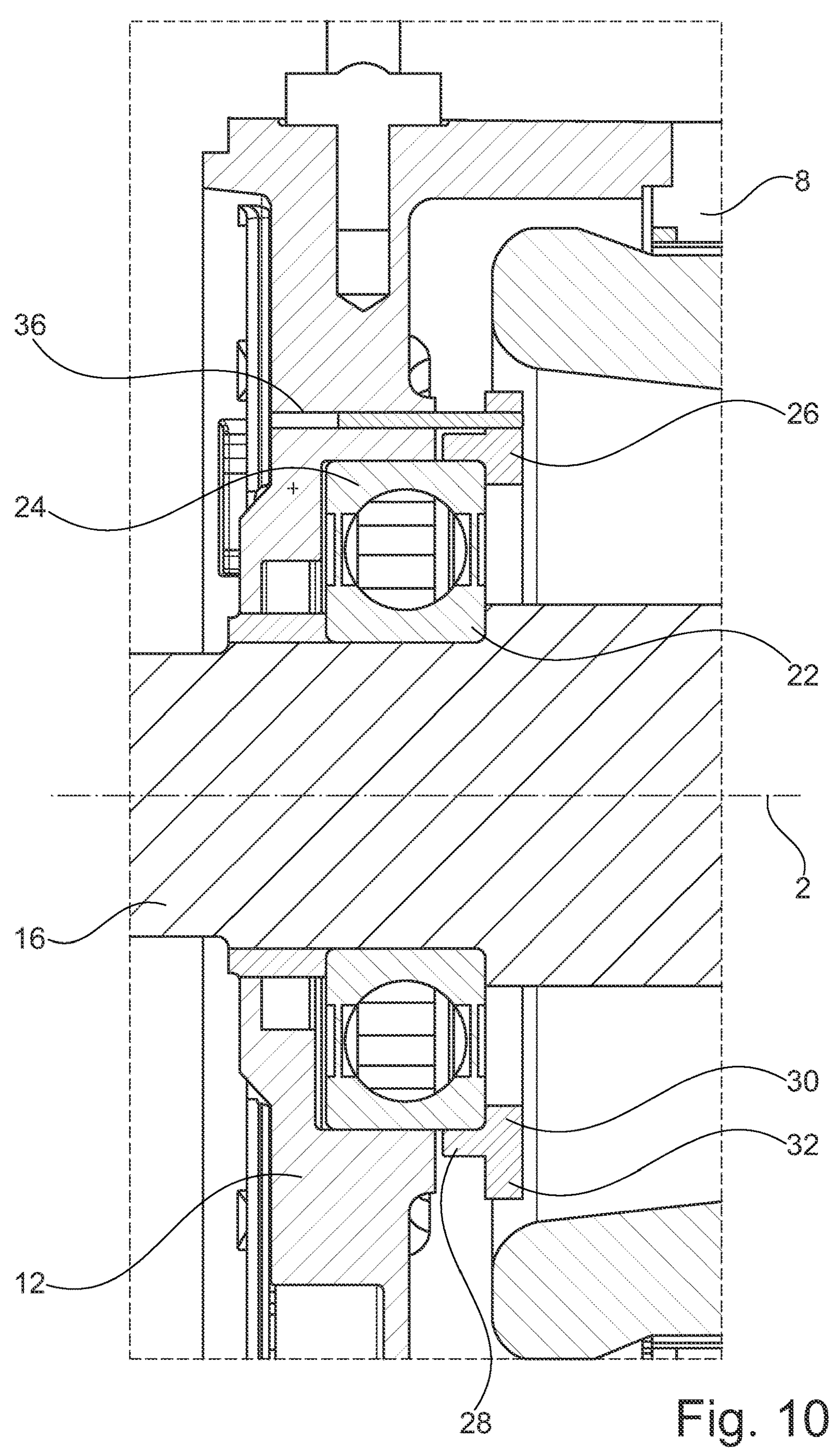
FIG. 10 shows a sectional illustration of a detail of the electric motor together with the adapter ring according to FIG. 8.

A pin, made of a steel, which forms the respective extension 34 is pressed into each of the holes 58, as illustrated in FIG. 9. The extensions 34 extend in parallel to the axis 2, and in each case rest in one of the corresponding receptacles 36 to form a clearance fit, as illustrated in FIG. 10 in a sectional illustration along the axis 2. The receptacles 36 are holes which extend in parallel to the axis 2, and which pass through the entire second component 12 in the axial direction.

The invention is not limited to the exemplary embodiments described above. Rather, other variants of the invention may also be deduced by those skilled in the art without departing from the subject matter of the invention. In particular, all individual features described in conjunction with the individual exemplary embodiments may also be combined with one another in some other way without departing from the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A bearing unit comprising:

a first component;

a second component;

an adapter ring that is non-rotatably and axially movable movably supported on the second component, the adapter ring being axially movable along an axis; and a roller bearing comprising an outer ring and an inner ring that is rotatable with respect to the outer ring about the axis, the inner ring being fastened to the first component, and the outer ring being fastened to the adapter ring, wherein the adapter ring has a circumferential body wall, a length of the circumferential body wall, in an axial direction that is parallel to the axis, being smaller than a length of an outer circumferential surface of the outer ring in the axial direction, such that when the outer ring is fastened to the adapter ring, the circumferential body wall of the adapter ring partially overlaps the outer circumferential surface of the outer ring in the axial direction so that the adapter ring partially surrounds the outer ring, wherein the adapter ring has at least two extensions that protrude from an outer surface of the circumferential body wall and run substantially in parallel to the axis, each of the at least two extensions being guided in a corresponding receptacle of the second component and each of the at least two extensions being monolithic with the circumferential body wall.

2. The bearing unit according to claim 1, wherein the adapter ring is shrink-fitted onto the outer ring.

3. The bearing unit according to claim 1, wherein the adapter ring further has a circumferential ridge, radially pointing away from the outer ring, the at least two extensions also being monolithic with the circumferential ridge.

4. The bearing unit according to claim 3, wherein circumferential ridge of the adapter ring has a threaded borehole that is congruent with a hole in the second component.

5. A method for manufacturing a structural unit having the bearing unit according to claim 4, the method comprising:

providing the first component to which the roller bearing is fastened;

fastening the adapter ring to the outer ring, the length of the circumferential body wall of the adapter ring in the axial direction being smaller than the length of the outer circumferential surface of the outer ring in the axial direction, such that when the adapter ring is fastened to the outer ring, the circumferential body wall of the adapter ring partially overlaps the outer circumferential surface of the outer ring in the axial direction so that the adapter ring partially surrounds the outer ring and the at least two extensions that protrude from the outer surface of the circumferential body wall are guided in the corresponding receptacle of the second component;

screwing a threaded rod into the threaded borehole of the adapter ring;

guiding the threaded rod through the hole in the second component, the adapter ring being arranged with respect to the second component such that the adapter ring is nonrotatably and axially movably supported on the second component, and fastening the second component to a further part.

6. An electric motor comprising the bearing unit according to claim 1, wherein the first component is a shaft, and the second component is an end shield.

7. A bearing unit comprising:

a first component;

a second component;

an adapter ring that is non-rotatably and axially movably supported on the second component, the adapter ring being axially movable along an axis; and a roller bearing comprising an outer ring and an inner ring that is rotatable with respect to the outer ring about the axis, the inner ring being fastened to the first component, and the outer ring being fastened to the adapter ring, wherein the adapter ring has at least two extensions protruding from and being monolithic with a circumferential ridge of the adapter ring that radially points away from the outer ring, the at least two extensions protruding in a direction substantially parallel to the axis and each of the at least two extensions being guided in a corresponding receptacle of the second component, and wherein the circumferential ridge of the adapter ring has a threaded borehole that is congruent with a hole in the second component, the threaded borehole being positioned between two extensions of the at least two extensions on the circumferential ridge of the adapter ring.

* * * * *